(12) United States Patent
Noguchi

(10) Patent No.: US 9,729,005 B2
(45) Date of Patent: Aug. 8, 2017

(54) FLUORESCENT LED LIGHTING DEVICE AND LIGHTING ON/OFF MODE SWITCHING METHOD THEREFOR

(71) Applicant: CyberCoin Inc., Tokyo (JP)

(72) Inventor: Hirokazu Noguchi, Tokyo (JP)

(73) Assignee: Hirokazu Noguchi, Tokyo (JP)

( * ) Notice: Subject to any disclaimer, the term of this patent is extended or adjusted under 35 U.S.C. 154(b) by 403 days.

(21) Appl. No.: 14/408,998

(22) PCT Filed: Jun. 17, 2013

(86) PCT No.: PCT/JP2013/066629
§ 371 (c)(1),
(2) Date: Dec. 18, 2014

(87) PCT Pub. No.: WO2013/191145
PCT Pub. Date: Dec. 27, 2013

(65) Prior Publication Data
US 2015/0155743 A1    Jun. 4, 2015

(30) Foreign Application Priority Data

Jun. 18, 2012   (JP) .................. 2012-137038

(51) Int. Cl.
*H02J 7/00*    (2006.01)
*H02J 9/00*    (2006.01)
(Continued)

(52) U.S. Cl.
CPC   *H02J 9/02* (2013.01); *H02J 9/06* (2013.01); *H02J 9/065* (2013.01);
(Continued)

(58) Field of Classification Search
USPC .................................. 307/66, 23
See application file for complete search history.

(56) References Cited

U.S. PATENT DOCUMENTS 4,323,820 A * 4/1982 Teich .............. H02J 9/065
307/66
8,093,823 B1   1/2012  Ivey et al.
(Continued)

FOREIGN PATENT DOCUMENTS

CN    101776240    7/2010
EP     2680673    1/2014
(Continued)

OTHER PUBLICATIONS

International Search Report for International Application No. PCT/JP2013/066629 dated Aug. 8, 2013. (2 pages).

*Primary Examiner* — Rexford Barnie
*Assistant Examiner* — Dru Parries
(74) *Attorney, Agent, or Firm* — Tutunjian & Bitetto, P.C.

(57) ABSTRACT

In order to add an emergency light function to a fluorescent LED lighting device, thereby increasing safety during a power outage, this LED lighting device, which can be mounted between a pair of sockets for fluorescent lighting, is equipped with a first power supply circuit, which lights the LED using direct current power obtained by converting/rectifying alternating current power supplied from the sockets, and a second power supply circuit, which lights the LED using an embedded battery. An embedded SW controller detects that a sudden drop in the current value or the voltage value in the lighting device, from a prescribed value Von when the lighting switch is turned on to a value that is essentially zero, occurs within a prescribed time T. When the sudden drop occurs two or more times in the prescribed time (FIG. 5), it is determined that a normal operation of turning off the light has been performed, and the light is turned off, and when the sudden drop occurs only once during the prescribed time (FIG. 6), it is determined that a power
(Continued)

outage has occurred, and the LED is lighted as an emergency light using the second power supply circuit.

4 Claims, 10 Drawing Sheets

(51) Int. Cl.
    *H02J 3/38*     (2006.01)
    *H02J 9/02*     (2006.01)
    *H05B 33/08*     (2006.01)
    *H02J 9/06*     (2006.01)

(52) U.S. Cl.
    CPC ..... *H05B 33/0806* (2013.01); *H05B 33/0845* (2013.01); *Y02B 20/386* (2013.01); *Y10T 307/344* (2015.04)

(56) References Cited

U.S. PATENT DOCUMENTS

| | | |
|---|---|---|
| 2004/0012959 A1 | 1/2004 | Robertson et al. |
| 2010/0244569 A1 | 9/2010 | Chandler et al. |
| 2011/0068692 A1 | 3/2011 | Tian et al. |
| 2011/0211330 A1 | 9/2011 | Wang |

FOREIGN PATENT DOCUMENTS

| | | |
|---|---|---|
| JP | 2009-105020 | 5/2009 |
| JP | 2009151946 | 7/2009 |
| JP | 3172228 | 12/2011 |
| JP | 3175965 | 6/2012 |

\* cited by examiner

FLUORESCENT LED LIGHTING DEVICE AND LIGHTING ON/OFF MODE SWITCHING METHOD THEREFOR

FIELD OF INVENTION

The present invention relates to an illumination device using a LED (light emitting diode) light source, which is usable in substitution of an existing fluorescent lamp, and a lighting ON/OFF mode switching method therefor.

BACKGROUND ART

Fluorescent lamps have been frequently used as indoor and outdoor illumination devices. However, they are not lightened in an emergency such as a power supply shutdown. Accordingly, the Building Standards Act of Japan requires that there should be installed emergency lights in commercial facilities and accommodations for the purpose of providing a sufficient degree of illumination to an escape route for evacuation.

However, the conventional emergency lights have been installed individually from the normal illumination devices, which should in practice limit the number and place of the emergency lights to be installed. This means that, in an emergency, only a small number of the emergency lights are lightened in darkness at limited places. Let us imagine that a power supply is accidentally interrupted due to an earthquake or fire in an underground railway or an underground shopping area, for example. The nearby people would tend to be moved to a better-lighted place, which will be strengthened by mass psychology. Therefore, all of the nearby people would rush toward the place of installment of the emergency lights, which could result in an expected accident.

In recent years, LED illumination devices usable in substitution of the existing fluorescent lamps have been proposed (for example, the following Patent Documents 1 and 2). This has well-improved properties such as energy-saving due to its lowered power consumption, ecology due to a decrease of $CO_2$, and safety because of no contents of toxic substance such as mercury and, therefore, it is expected that the LED illumination devices will come into wider use in future. Nevertheless, it has been less contemplated that the LED illumination devices should be used in an emergency such as a power supply shutdown Patent Document 1: Japanese Patent (Un-examined) Publication No. 2004-192833
Patent Document 2: Japanese Patent (Un-examined) Publication No. 2004-303614

SUMMARY OF INVENTION

Problems to be Solved by Invention

Accordingly, a problem to be solved by the present invention is to provide an illumination device using an LED light source, which is usable in substitution of the existing fluorescent lamp, to which is added a function that it is automatically lightened in an emergency such as a power supply shutdown, so that, even when a power supply is interrupted due to an earthquake or a fire in an underground railway or an underground shopping area, for example, everybody in said area can take refuge in safety and at ease, thereby preventing an unexpected accident. Another problem to be solved by the present invention is to provide a suitable method for switching and controlling an on/off mode of a fluorescent type LED illumination device in good manner.

Means for Solving the Problems

To solve these problems, according to claim 1 of the present invention, there is provided a fluorescent LED illumination device fittable between a pair of sockets already provided for a fluorescent lamp, which comprises a first power supply circuit that illuminates LED's by using a DC power obtained by converting and rectifying an AC power supplied from the sockets, a second power supply circuit that illuminates the LED's by using an internal buttery, and a controller that discriminates one of a normal lighting mode wherein the LED's are lightened via said first power supply circuit or said second power supply circuit when a light switch is ON, a normal light-out mode wherein the LED's are not lightened when said light switch is OFF and an emergency lighting mode wherein the LED's are lightened as emergent lights via said second power supply circuit when an AC power supply is not alive, said controller further operating, in response to a result of said discrimination, to select an applicable one among said normal lighting mode, said normal light-out mode and said emergency lighting mode. The controller detects a change, within a predetermined time interval, of a voltage or current value of electricity flowing into the illumination device. When detecting that, within the predetermined time interval, said value is lowered only one time from a predetermined value of electricity that will normally flow when the light switch is ON to substantially zero, which remains standstill, it discriminates such that a power failure interrupts the AC power supply and controls such that the normal lighting mode should be switched to the emergency lighting mode. Whereas, when detecting that, within the predetermined time interval, there occurs a change of the current or voltage value including a decrease from the predetermined value of electricity that will normally flow when the light switch is ON to substantially zero, followed by an increase to said predetermined value, it discriminates such that the normal light-out operation has been carried out and control such that the normal lighting mode should be switched to the normal light-out mode.

According to claim 2 of the present invention, in the fluorescent LED illumination device of claim 1, the controller discriminates such that the normal light-out operation has been carried out when detecting that sequential OFF→ON→OFF operation of the light switch that was formally ON has been carried out within the predetermined time interval, and thus controls such that the normal lighting mode should be switched to the normal light-out mode.

According to claim 3 of the present invention, in the fluorescent LED illumination device of claim 1 or 2, the controller discriminates such that the normal light-out operation has been carried out when detecting that sequential OFF→ON operation of the light switch that was formerly ON has been carried out within the predetermined time interval, and thus controls such that the normal lighting mode should be switched to the normal light-out mode. It will constantly monitor an electricity condition and, as far as that is confirmed, the LED's are lightened in the normal lighting mode, but once confirming interruption of electricity, the normal lighting mode will soon be switched to the emergency lighting mode so that the LED's are lightened as an emergency light.

According to claim 4 of the present invention, there is provided a method for switching lighting modes in a fluorescent LED illumination device fittable between a pair of sockets already provided for a fluorescent lamp, which includes a first power supply circuit that illuminates LED's by using a DC power obtained by converting and rectifying an AC power supplied from the sockets, and a second power supply circuit that illuminates the LED's by using an internal buttery, said fluorescent LED illumination device being driven and controlled in either one of a normal lighting mode wherein the LED's are lightened via said first power supply circuit or said second power supply circuit when a light switch is ON, a normal light-out mode wherein the LED's are not lightened when said light switch is OFF and an emergency lighting mode wherein the LED's are lightened as an emergency lamp via said second power supply circuit when an AC power supply is interrupted. The method comprises the steps of detecting a change, within a predetermined time period, of a voltage or current value of electricity flowing into the illumination device, switching the normal lighting mode to the emergency lighting mode, when detecting that, within the predetermined time interval, said value is decreased only one time from a predetermined value of electricity that will normally flow when the light switch is ON to substantially zero, which remains standstill, resulting in discrimination that a power failure interrupts the AC power supply, and switching the normal lighting mode to the normal light-out mode, when detecting that, within the predetermined time interval, there occurs a change of the current or voltage value including a decrease from the predetermined value of electricity that will normally flow when the light switch is ON to substantially zero, followed by an increase from the decreased value back to said predetermined value, resulting in discrimination that the normal light-out operation has been carried out.

Advantages of Invention

In accordance with the present invention defined in claim 1, it is possible to automatically determine an applicable mode from among the normal lighting mode, the normal light-out mode and the emergency lighting mode in which the LED illumination device is operable, and suitably control the LED lighting ON/OFF depending upon the situations. For example, when a power from the first power supply circuit is interrupted in an emergency such as a power failure, which is not caused by the normal light-out operation of the light switch, it is automatically discriminated that the emergency lighting mode should be applicable, so that it is controlled such that the battery mounted in the LED illumination device is driven to lighten the LED's. In the prior art emergency lighting system, only a limited number of the emergency lights among those installed at the power failure location will be lightened in an emergency. The system of the present invention will lighten all the LED illumination devices installed at the power failure location. Accordingly, even when a power supply is interrupted due to an earthquake or a fire in an underground railway or an underground shopping area, for example, everybody in said area can take refuge in safety and at ease. Also, when there happens a sudden light-out due to a power failure in a store or an office during business hours, it is possible to automatically and instantly switch the drive source to the battery so as to lighten all the LED illumination devices, which will not interfere with normal business operation.

In accordance with the present invention defined in claim 2, the controller discriminates such that, when sequential OFF→ON→OFF operation of the light switch that was formerly ON has been carried out within a predetermined time interval, this is the normal light-out operation. This makes it possible to make suitable judgment in response to detection of specific condition that is obviously different from the condition at the time of power failure wherein only one sudden decrease of the current or voltage value occurs within the predetermined time interval. The normal light-out operation to be carried out in this control will require that, when a person is going to leave a room, he or she operates the light switch in a way different from the prevailing light-out operation (by only one turning OFF). Yet, this series of operation is quite simple and easily memorable and, therefore, will cause no inconvenience in practice. If the person should by mistake operate the light switch in the prevailing manner, after an elapse of a short period of time (the predetermined time interval), the lighting mode is switched to the emergency lighting mode so that a part or a whole of the fluorescent LED illumination devices installed in the room are lightened as the emergency lights, by which the person would soon become aware of the mistake, so that he or she may be back to the room to first turn the light switch ON and then carry out the light-out operation in the prescribed way.

In accordance with the present invention defined in claim 3, the controller discriminates such that, when sequential OFF→ON operation of the light switch that was formerly ON has been carried out within a predetermined time interval, this is the normal light-out operation. This makes it possible to make suitable judgment in response to detection of a specific condition that is obviously different from the condition at the time of power failure wherein there is only one sudden decrease of the current or voltage value within the predetermined time interval. The normal light-out operation to be carried out in this control will require that, when a person is going to leave a room, he or she operates the light switch in a way different from the prevailing light-out operation (by only one operation of ON→OFF). Yet, this series of operation is quite simple and easily memorable and, therefore, will cause no inconvenience in practice. If the person should by mistake operate the light switch in the prevailing manner, after an elapse of a short period of time (the predetermined time interval), the lighting mode is switched to the emergency lighting mode so that a part or a whole of the fluorescent LED illumination devices installed in the room are lightened as the emergency lights, by which the person would soon become aware of the mistake, so that he or she may be back to the room to first turn the light switch ON and then carry out the light-out operation in the prescribed way.

Further, in this embodiment, it will constantly check the electric flow condition even in the normal light-out condition, which makes it possible to lighten the LED's installed in the room, when the power supply is cut off even after all the persons have left the room. Accordingly, when workers are going to enter the room for the purpose of doing the restoration works to recover the power supply, they may work in a safe working environment. In addition, when any stuff who does not know the power supply shutdown is going to enter the room, he or she will be free from feeling the something is wrong or strange.

In one embodiment, the system is so designed that, when sequential OFF→ON operation of the light switch that was formerly ON has been carried out within a predetermined time interval, the lighting mode is switched to an electric flow detection mode and the system is stand by in the normal light-out mode, wherein it may be switched to the emergency lighting mode for lightening the illumination devices as the emergency light, immediately after a power supply should be cut off, whereas, when another sequential OFF→ON→OFF operation of the light switch that was formerly ON has been carried out, the lighting mode is switched to the normal light-out mode to turn off the illumination device. As such, any light-out mode to be operated by the user may be selectively determined depending upon the user's desire.

In accordance with the present invention defined in claim 4, it is possible to automatically determine an applicable mode from among the normal lighting mode, the normal light-out mode and the emergency lighting mode in which the LED illumination device is operable, and to suitably control the LED lighting ON/OFF depending upon the situations.

MOST PREFERRED EMBODIMENTS OF INVENTION

The present invention will be described in detail in connection with some embodiments thereof.

Embodiment 1

Figure 1:
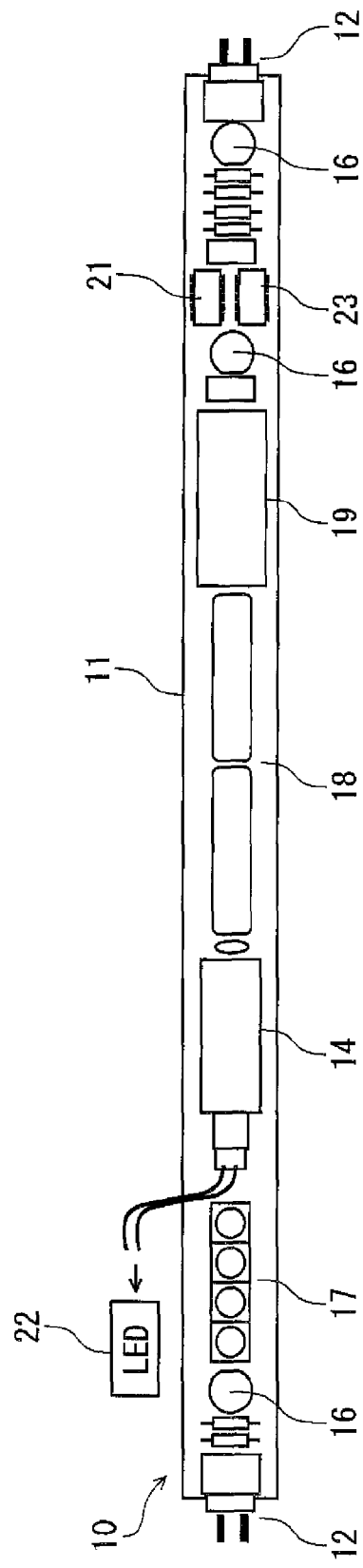
FIG. 1 A schematic view showing the construction of a fluorescent lamp type LED illumination device according to the present invention.
Figure 2:
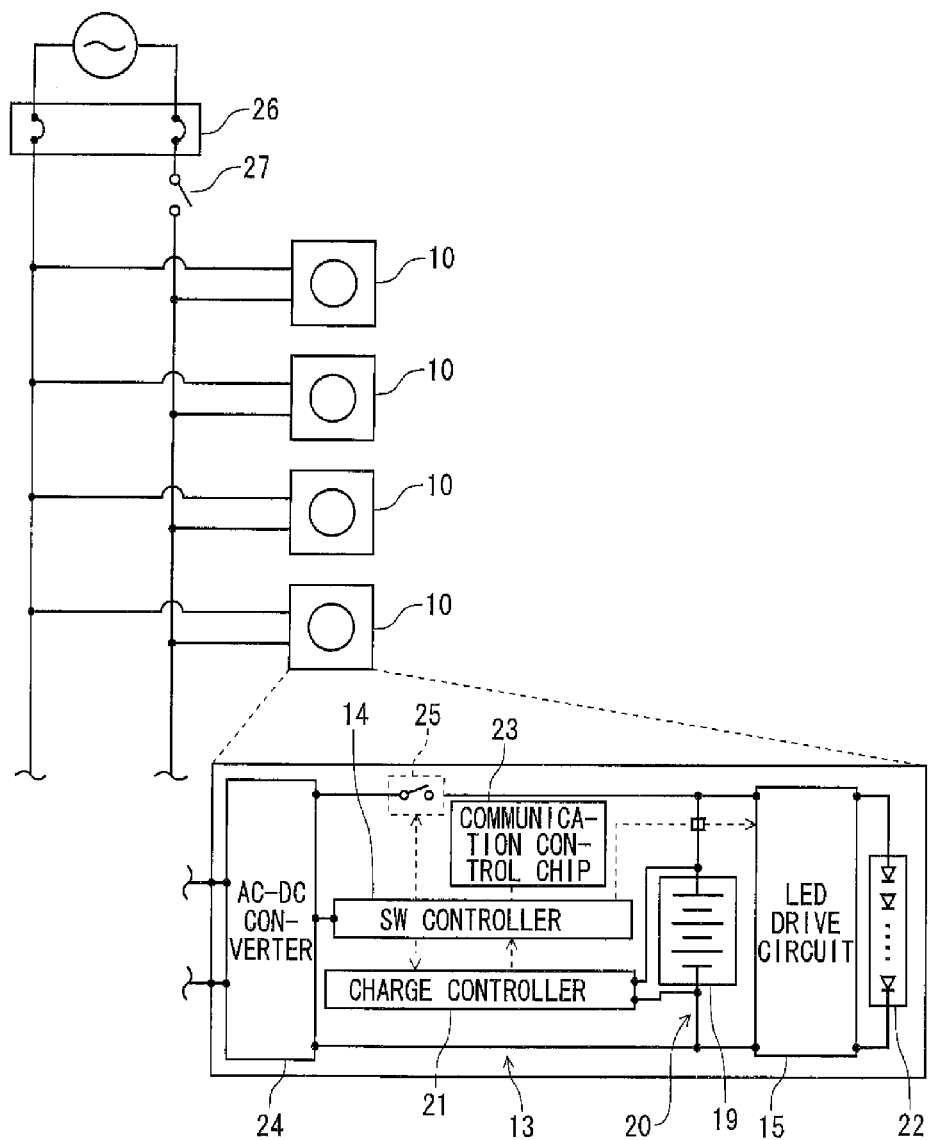
FIG. 2 A block diagram showing a system using this LED illumination device.

In reference to FIG. 1 and FIG. 2, an LED illumination device 10 is usable in substitution of the existing fluorescent lamp, which has the same size and shape as those of the existing fluorescent lamp and may be fitted between a pair of sockets already installed for the existing fluorescent lamp. The LED illumination device 10 has a cover 11 of substantially a cylindrical cross-section, in which an LED mount base (not shown) for mounting LED's thereon is securely contained. The light emitting from the LED's is transmitted through or diffused by the cover 11 for illumination. In one embodiment, the cover 11 is divided into two substantially half-around parts, one comprising a cover member made of plastic material having light transparency, light semi-transparency or light diffusion property, such as polycarbonate, and the other comprising a heat sink made of heat radiation property, such as aluminum. The LED mount base or substrate is contained in the cover member, and power supply circuits including a battery, which will be described later, are contained in the heat sink.

As already known in Patent Documents 1 and 2, the LED illumination device 10 has a power supply circuit (a first power supply circuit 13) that illuminates the LED's 22 on the substrate by supplying a DC power to an LED drive circuit 15, said DC power being obtained by transforming and rectifying an AC power supplied from sockets (not shown) already installed for the existing fluorescent lamp, when it is fitted through bases 12 between the sockets. The first power supply circuit 13 includes an AC-DC converter 24 (see FIG. 2, not shown in FIG. 1) for converting the AC power to the DC power, a rectifier 16 for rectifying the DC power outputted from the AC-DC converter 24, a voltage transformer 17 for transforming the DC power to be of a predetermined voltage, an electrolytic capacitor 18 (see FIG. 1, none of them being shown in FIG. 2) serving as a buffer for temporary storage of electricity to stabilize the power supply, etc. As described later, in normal operation, when an external switch 27 mounted on a wall, for example, in the existing fluorescent lamp lighting system, is turned ON, the DC power is supplied via the first power supply circuit 13 to the LED drive circuit 15 to lighten the LED's 22 so that the LED illumination device 10 is turned on, and, in the meantime, it is turned off when the switch 27 becomes OFF to interrupt the power supply.

The LED illumination device 10 further comprises a second power supply circuit 20 for illuminating the LED's 22 by the battery 19. In order that the battery 19 is capable of lightening the LED's for a maximum period of time, it is preferable that the battery 19 is sufficiently small to be contained in the light cover 11, while having a battery capacity as much as possible. At present, use of a lithium ion battery is most suitable. A switch controller 14 will control such that an IC switch 25 arranged in the first power supply circuit 13 is opened and closed under the predetermined conditions, thereby controlling the switching of the power supply circuits 13, 20 to be used for lightening the LED's 22. A charge controller 21 will constantly monitor the residual amount of the battery by detecting the voltage and current values in the battery 19. When the residual amount of the battery reaches the upper or lower threshold, it will send a signal notifying this to the switch controller 14. In another embodiment, the upper and lower thresholds of the residual amount of the battery are stored in the internal IC switch 25 as one of the product specifications or values determinable by the user, and it will discriminate that the residual amount has reached the upper/lower threshold in response to a residual amount detecting signal from the charge controller 21. Because a voltage of the lithium ion battery must be precisely controlled at the time of charge and discharge, the charge controller 21 will control such that it remains 4.2V when it is charged and 3.0V when discharged. The switch controller 14 and the charge controller 21 (which constitutes "controller" in the present invention) will make various control, which will be described below in detail.

Figure 3:
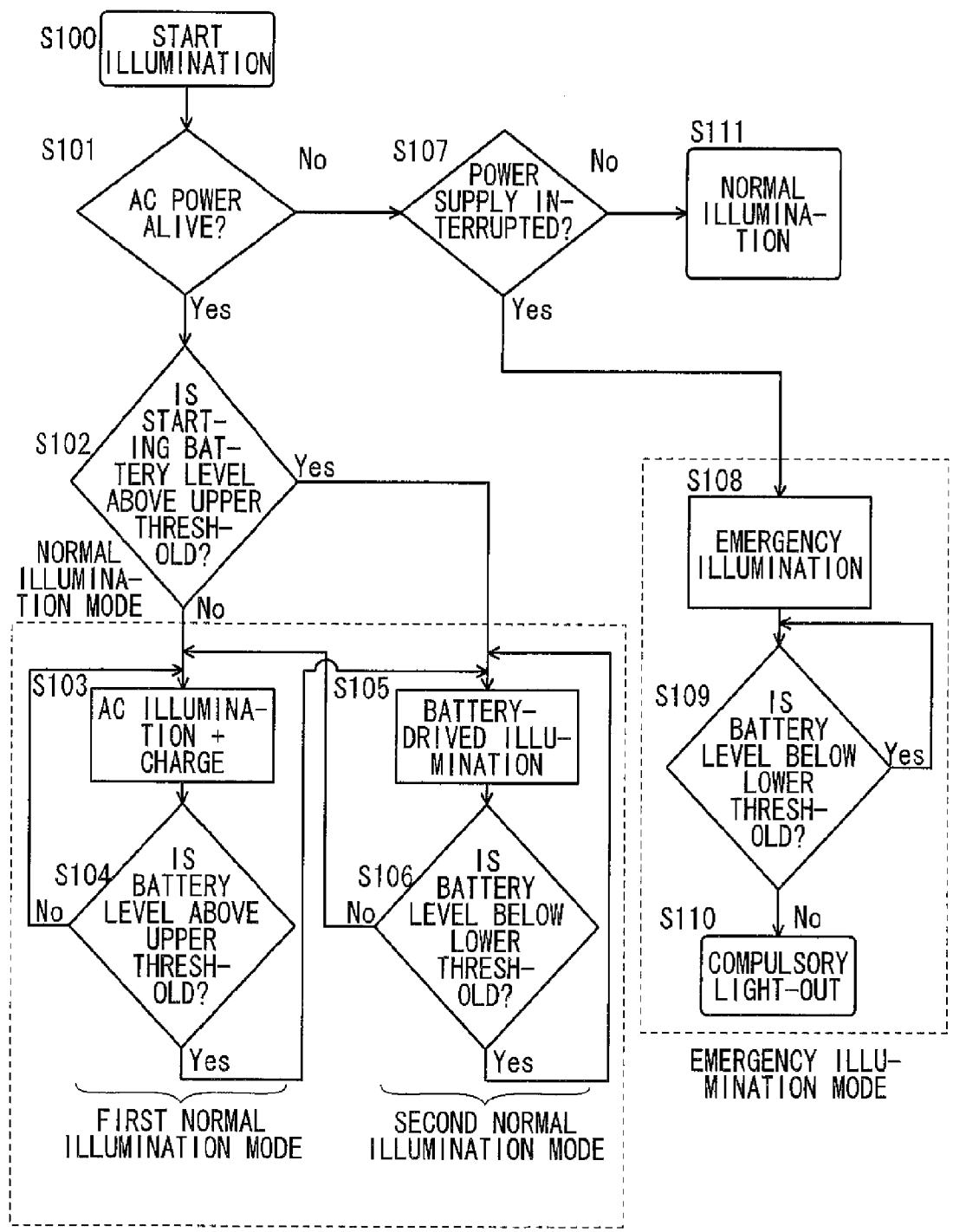
FIG. 3 A flowchart showing the outline of the light control of the LED illumination device of Embodiment 1.

The schematic control flow will be first described in reference to the flowchart shown in FIG. 3. Provided that the normal operation (an external switch 27 to be described later: ON) has been done for lightening a group of LED illumination devices 10, that may be all of the illumination devices in a facility concerned or a part of those in an optionally partitioned area (S100). At S101, it is confirmed whether or not a necessary AC power is alive in a facility such as an office and a shop where a plurality of LED illumination devices 10 are installed. This may be achieved by, for example, connecting an ammeter and/or a voltmeter to an AC power line through which AC power is supplied to all of the plural LED illumination devices in the facility or a part of those in the optionally partitioned area, so that a current value and/or a voltage value flowing through the AC power line should be monitored at all times.

When the electricity flow is confirmed (S101:Yes), at S102, it is confirmed whether or not the residual amount of the battery is enough to lighten the LED's only by the battery 19. More particularly, an upper threshold representing a residual amount of the battery that should be necessary to start the LED's to be lightened by the battery 19 is predetermined, and when the residual amount is below the upper threshold (S102:No), the illumination device is controlled to be operated in the first normal illumination mode wherein the LED drive circuit 15 is driven by DC power that is obtained by transforming and rectifying AC power supplied to the respective LED illumination devices 10, and the battery is charged also by the said DC power (S103). By way of example, in this mode, the total luminous flux of the LED illumination device 10 is 2500 Lm and the power consumption is the order of 22-25 W. During operation in the first normal illumination mode, a residual amount of the battery is monitored at S104, and the operation in this first normal illumination mode will go on until the residual amount is restored to above the upper threshold (S104:Yes).

On the other hand, when the residual amount of the battery exceeds the threshold (S102:Yes), the illumination device is controlled to be operated in the second normal illumination mode wherein the LED drive circuit 15 is driven only by the battery 19 to lighten the LED's 22 (S105). In the second normal illumination mode, by way of example, the total luminous flux of the LED illumination device 10 is 1900 Lm and the power consumption is zero because no AC power is used in this mode. During operation in the second normal illumination mode, a residual amount of the battery is monitored at S106, and the operation in this second normal illumination mode will go on as far as the residual amount of the battery keeps above the predetermined lower threshold (S106:Yes).

When the residual amount becomes again above the upper threshold (S104:Yes) as a consequence that the battery 19 has been charged during operation in the first normal illumination mode, the first normal illumination mode is switched to the second normal illumination mode. When the battery is discharged during operation in the second normal illumination mode so that the residual amount becomes below the lower threshold (S106:No), the second normal illumination mode is switched to the first normal illumination mode.

When the electricity flow is not confirmed (S101:No), at S107, it is discriminated if this is caused by the normal light-out operation or by power supply shutdown in an emergency. A technical method for this discrimination will be described later in detail. When it is discriminated that there is no emergency power supply shutdown (S107:No), which should mean that the normal operation (by the external switch 17 to be described later:OFF) for turning off a group of the LED illumination devices 10 has been done, all of the LED illumination devices 10 in a facility concerned or a part of those in an optionally partitioned area are turned off in the normal light-out mode (S111). Also in this case, as far as there is no power supply shutdown, AC power is supplied to the LED illumination device 10 to charge the battery 19 (as will be described later).

When the emergency power supply shutdown is found (S107:Yes), the LED illumination device 10 is controlled in the emergency illumination mode, at S108. The LED illumination device 10 should be used as an emergency light in this case, so that it is practically sufficient to be lightened at the total luminous flux of 400-500 Lm or around. The power consumption is zero, because the LED drive circuit 15 is driven only by the battery 19 to lighten the LED's 22. The battery 19 will be gradually discharged while the LED illumination device 10 is lightened in the emergency illumination mode, so that it is discriminated at S109 whether or not there is a residual amount sufficient to keep the LED's lightened only by the battery 19 as the emergency light. More particularly, a lower threshold representing a residual amount of the battery that is necessary to keep the LED's to be lightened as the emergency light is predetermined, and as far as the residual amount remains above the lower threshold (S109:Yes), the illumination device is kept lightened as the emergency light. On the contrary, when it reaches below the lower threshold (S109:No), the illumination device 10 is controlled to be compulsorily turned off (S110). This will prevent the battery 19 from being entirely discharged.

The battery level check at S102, S104, S106 and S109 (and also at S112 and S113 in FIG. 12 and at S112, S113 and S115 in FIG. 13, which will be described later) may be carried out by monitoring a voltage value and/or a current value of the battery 19 at all times or at constant intervals, which may be practiced with a single sensor. In one embodiment, the discrimination at S102 and S104 is carried out in response to a signal that is produced by the sensor when detecting that the residual amount is above or below an upper threshold (a voltage of 90%, for example, of the full-charged one), the discrimination at S106 is carried out in response to another signal that is produced by the sensor when detecting that the residual amount is above or below a lower threshold (a voltage of 20%, for example, of the full-charged one), and the discrimination at S109 is carried out in response to still another signal that is produced by the sensor when detecting that the residual amount is above or below another lower threshold (a voltage of 10%, for example, of the full-charged one). The lower threshold used in the discrimination at S106 and S109 may be same, but it is preferable that, as indicated in the above examples, the lower threshold used in S109 is determined to be somewhat lower than the other, which will be effective in keeping the function of the emergency light for a longer period of time, while preventing the complete discharge of the battery.

Figure 4A:
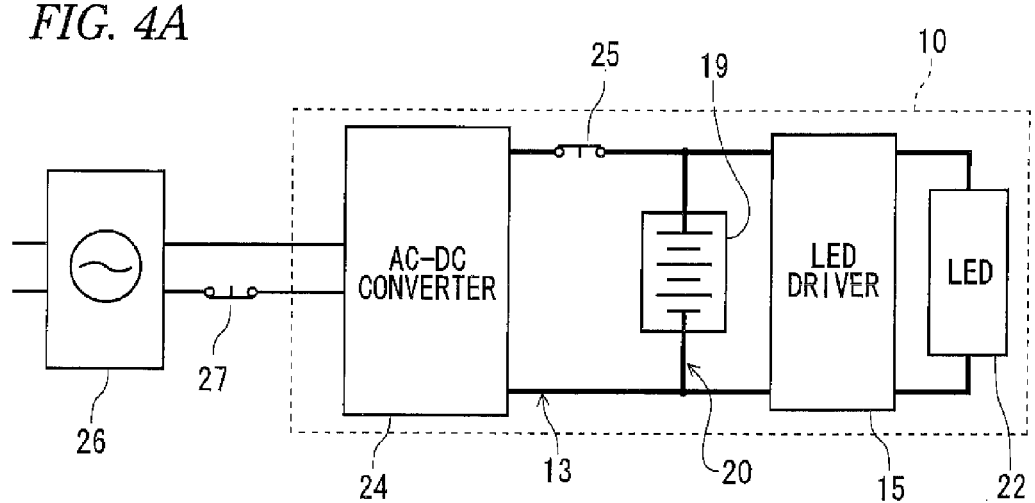
FIG. 4 Explanatory views showing the power supply switch control to be carried out in the normal illumination mode in Embodiment 1.
Figure 4B:
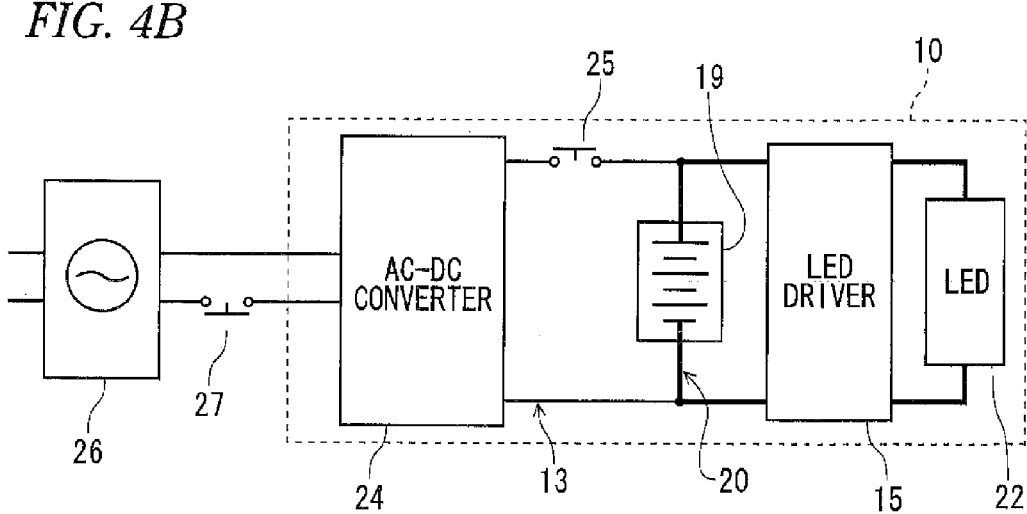

The control to be carried out when the external switch 27, mounted on a wall, for example, in the facility for turning on and off the illumination devices 10 remains ON, which comprises S103-S106 in the flowchart of FIG. 3 for control in the normal illumination mode, will be described in reference to FIG. 4 as well as FIG. 3. In this case, the switch controller 14 will operate, in response to the charge of the battery 19 (which is discriminated at S102 of FIG. 3), to make the switching control, by opening/closing the internal IC switch 25, between the first normal illumination mode wherein the LED drive circuit 15 is driven by DC power that is obtained by transforming and rectifying AC power supplied from the distribution board 26 in the facility to the respective LED illumination devices 10, and the battery 19 is charged also by the said DC power (FIG. 3:S103, FIG. 4(*a*)) and the second normal illumination mode wherein the LED drive circuit 15 is driven only by the battery 19 to lighten the LED's 22, with no consumption of AC power, when the battery 19 remains still sufficiently charged (FIG. 3:S105, FIG. 4(*b*)).

More specifically, when the external switch 27 is ON while the electricity is normally supplied from the distribution board 26 in the facility (S101:Yes), the battery 19 is gradually charged while the LED's 22 are lightened in the first normal illumination mode. When receiving from the charge controller 21 a detection signal notifying that the residual amount of the battery reaches the predetermined upper threshold (S104:Yes), the switch controller 14 controls such that the internal IC switch 25 is turned OFF to switch the illumination mode from the first normal illumination mode to the second normal illumination mode. The battery 19 will be gradually exhausted while the LED's 22 are in illumination in the second normal illumination mode. When receiving from the charge controller 21 another detection signal notifying that the residual amount reaches the predetermined lower threshold (S106:No), the switch controller 14 controls such that the internal IC switch 25 is turned ON to switch the illumination mode from the second normal illumination mode to the first normal illumination mode. In another embodiment, time intervals are determined in advance for keeping the LED's lightened in the first normal illumination mode and in the second normal illumination mode, respectively (for example, the LED's 22 are lightened in the first normal illumination mode for one hour and then in the second normal illumination mode for three house, and this cycle is repeated), and the illumination mode is switched between the first normal illumination mode and the second normal illumination mode to meet the predetermined time intervals. In this embodiment, it is preferable to make the switching control in response to the residual amount together with the above-described control. For example, when the residual amount reaches the predetermined lower threshold during operation in the second normal illumination mode, even if within the time interval, it is switched to the first normal illumination mode to prevent an over-discharge of the battery 19.

When the external switch 27 becomes OFF during operation in the normal illumination mode, a power supply to the illumination device 10 is interrupted at once, which is detected by the switch controller 14 (S101:No) to stop the LED drive circuit 15, thereby turning the LED's 22 off. As having been described, as far as AC power is normally supplied from the main power source, the LED's 22 are switched on and off in response to ON/OFF of the external switch 27 to execute the normal illumination/light-out operation.

In accordance with the fluorescent lamp type LED illumination device 10 according to the present invention, when AC power supply from the main power source is interrupted in case of power shutdown, for example, even if the LED's 22 are lightened by the first power supply circuit 13 in the normal illumination mode (the first normal illumination mode), this is compulsorily switched to the second power supply circuit 20 so that the LED's are lightened by the battery 19 so as to become usable as an emergency light. The Building Standards Act of Japan requires that the emergency lights should be installed in commercial facility, industrial facility and accommodations, which are illumination devices for assuring necessary illumination to the evacuation route in a room interior or along corridors, in case of power supply shutdown. Under these legal obligations, an emergency light should be kept lightened at a constant luminous intensity (more than one lux, for example, when measured on a floor) for a period of several dozens of minutes to several hours, regardless of ON/OFF of the external switch 27. For this purpose, there is a third power line to be used for detection of the power supply shutdown, in addition to two AC power lines to be used for the normal illumination. By designing such, even after the external switch 27 is turned off for the normal light-out, it is possible to realize a power supply shutdown by detecting that there is electricity flow in the power-supply-shutdown detection line, thereby lighting the interior LED illumination device 10 as the emergency light.

However, for ordinary stores or offices, it would be sufficiently effective in practice to design such that the LED's 22 are lightened as an emergency light, when the illumination device has been normally lightened (in the first normal illumination mode or in the second normal illumination mode) with the external switch 27 being ON but just suddenly been turned off due to a power supply shutdown (that is, when a power supply shutdown occurs while some stuff and/or guest remains in the room). Such a system wherein the illumination device functions as a simple emergency light would also be effective, where there is no power line for the emergency lights in a facility having a small floor space or a small number of floors. From these points of view, according to an embodiment of the present invention, the switch controller 14 discriminates a power supply shutdown by flowing a weak electric current into the circuit, so that the illumination device may function as a simple emergency light. The configuration and operation of this embodiment will be described in reference to FIG. 5 and FIG. 6 in addition to FIG. 1 to FIG. 3.

From these points of view, the present invention provides a novel and useful technique in order to discriminate, when no electricity flow is confirmed (S101:No), whether this results from the normal light-out operation or from the emergent power supply shutdown (S107). This control procedure will now be described in detail in reference to FIG. 5 and FIG. 6. This control is carried out by the switch controller 14 mounted in each LED illumination device 10. The switch controller 14 is equipped with time-measuring function, which comprises by way of example a counter IC chip that generates pulse circuits and measures time by counting the number of pulses.

This manner of discrimination presupposes that the normal light-out operation is carried out by the sequential OFF→ON→OFF operation of an external switch 27 (on a wall), formerly being ON, within a predetermined time interval. As compared with the prevailing light-out operation comprising only one ON→OFF operation of the external switch, this light-out operation requires the user to do the light-out operation in an unique manner. Accordingly, this manner of light-out operation should preferably be indicated near the external switch 27. The predetermined time interval in which the above-described sequential operation is to be carried out should preferably be of the order of several to ten seconds, taking into consideration that a person who have just made the light-out operation not in the prescribed sequential manner and then left the room may still stay in an area not too far to recognize and feel strange that the LED illumination device 10 in the room happens to be lightened again. This will further be described later in more detail.

Figure 5:
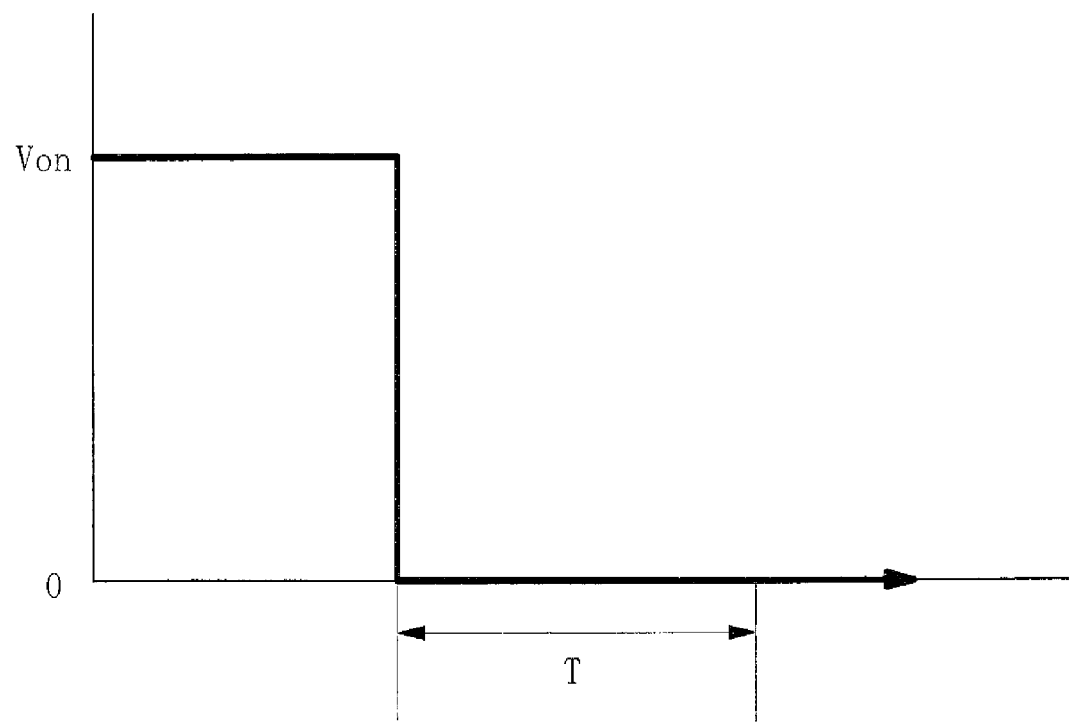
FIG. 5 An explanatory view showing the electric signal change in the switch controller, which should appear when sequential operation of the external switch ON/OFF has been carried out in accordance with the prescribed procedure for the normal light-out in Embodiment 1.

FIG. 5 is an explanatory view showing the electric signal change in the switch controller 14, which should appear when the sequential OFF→ON→OFF operation of the external switch 27, formerly being ON, has been carried out. In response to the first (ON→)OFF operation, the current or volume value flowing into the switch controller 14 is lowered from Von that is a value in the ON condition to substantially zero, which is increased back to Von in response to the second (OFF→)ON operation, which is then reduced again to substantially zero in response to the last (ON→)OFF operation. When this sequential operation is completed within a predetermined time interval, that is, when the switch is operated first by the (ON→)OFF operation, then by the (OFF→)ON operation and by the (ON→)OFF operation at last to be completed within a predetermined time interval from the first operation, it is discriminated such that this is the normal light-out operation by which the user intends to turn off the lights (S107:No), and all the LED illumination devices 10 in the room are turned off (S111). In this case, the LED illumination devices 10 in the room remains in the light-out state, until the normal light-in operation of (OFF)ON is carried out, which will not at all be lightened as the emergency lights.

Figure 6:
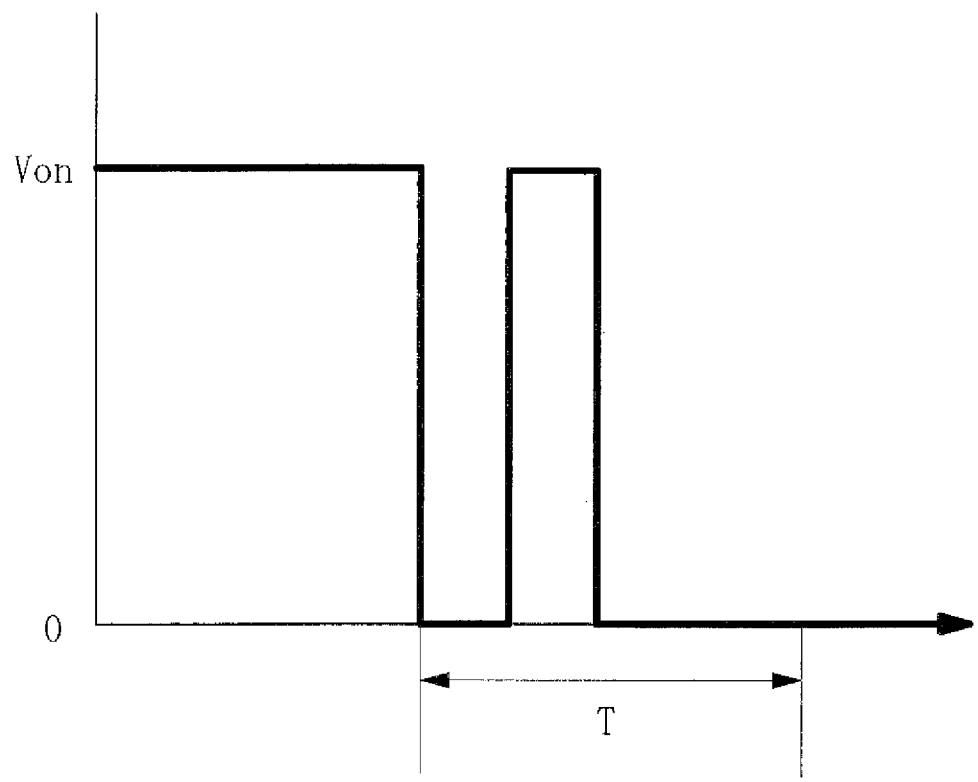
FIG. 6 An explanatory view showing the electric signal change in the switch controller, which should appear when the power supply is cut off in Embodiment 1.

FIG. 6 is an explanatory view showing the electric signal change in the switch controller 14, which should appear when the power supply is cut off. In this case, the current or volume value flowing into the switch controller 14 is suddenly lowered from Von that is a value in the ON condition to substantially zero, and the amount of electricity remains zero, even after the predetermined time interval T has passed, as far as the power failure goes on. In this case, the switch controller 14 discriminates such that a power has failed (S107:Yes), and controls such that a part or a whole of the LED illumination devices 10 should be lightened as the emergency lights (S108).

Let us suppose that a person leaving the room intends to carry out the normal light-out operation but forgets the above-identified sequential manner of operation and actually do the only one (ON→)OFF operation that has been well-known in the prior art as the normal light-out operation. In this case, the condition is similar to the case of FIG. 5, and the switch controller 14 discriminates such that a power has failed (S107:Yes) so that a part or a whole of the LED illumination devices 10 in the room are lightened as the emergency lights (S108). However, as described above, the predetermined time interval T is a very short period of time, say of the order of several to ten seconds. Accordingly, the person leaving the room may still in an area not too far from the room and recognize that the LED illumination devices 10 are lightened as the emergency lights. When noticing the lightening of the emergency lights, the person comes to recognize that he or she has not followed the prescribed sequential step for the light-out operation and comes back to the room so as to operate the external switch 27 OFF→ON and then do correctly the prescribed sequential light-out operation.

Embodiment 2

In accordance with Embodiment 1 described above, when the sequential ON/OFF operation based on the prescribed manner is completed within a predetermined time interval, the switch controller 14 discriminates such that the normal intentional light-out operation has been carried out (S107: No) and turns off all the LED illumination devices 10 in the room (S111). If a power supply shutdown should happen in this state, the LED illumination devices 10 cannot be lightened as the emergency lights. Accordingly, when workers are going to enter the room for the purpose of doing the restoration works to recover the power supply, they might feel inconvenience and could not work in a safe working environment. In addition, when any stuff who does not know the power supply shutdown is going to enter the room, he or she may also feel something wrong or strange. Another embodiment designed to avoid such disadvantages will now be described in reference to FIG. 7 and FIG. 8.

Figure 7:
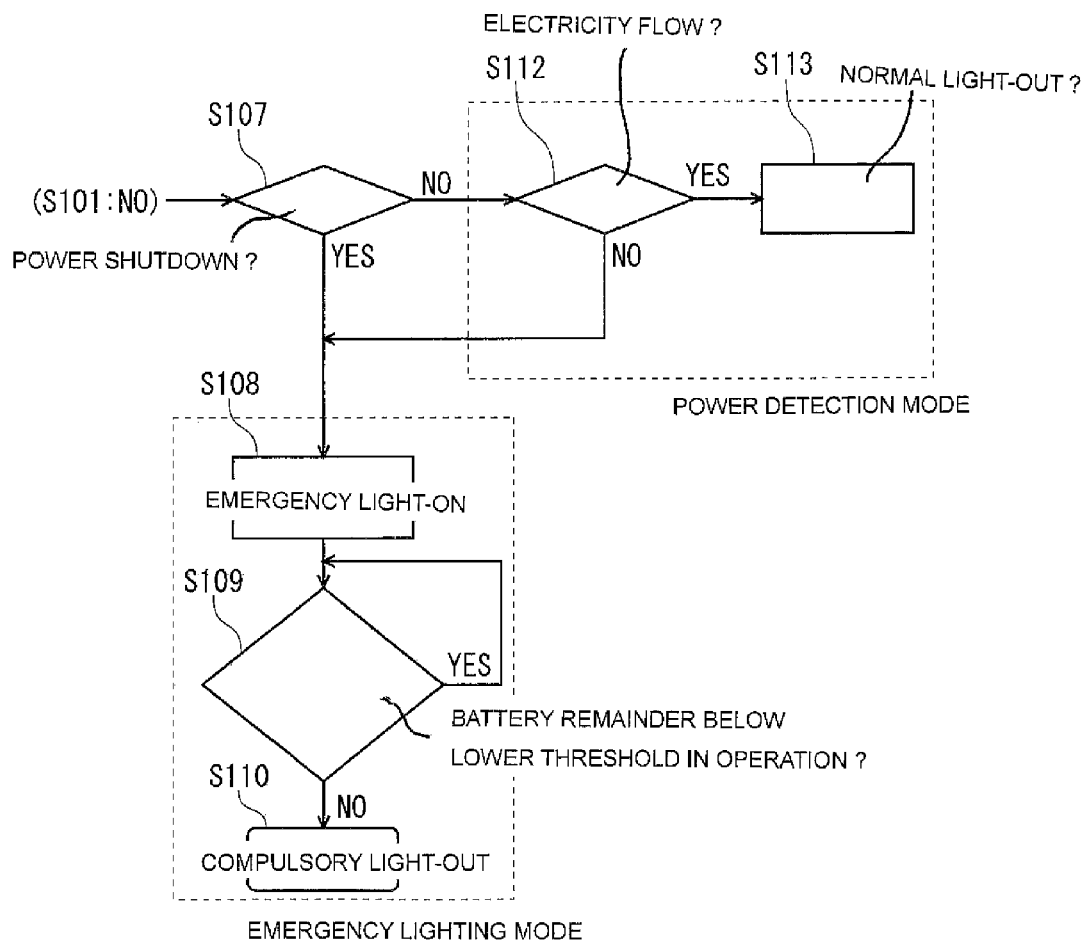
FIG. 7 A flowchart showing the outline of the light control of the LED illumination device of Embodiment 2.

FIG. 7 is a flowchart showing the outline of the light control of the LED illumination device 10 in accordance with this embodiment, which only shows a part of flows different from the light control flowchart of FIG. 3 in accordance with Embodiment 1. When it is so discriminated that no power supply shutdown has happened (S107:No) in a manner to be described later, in this embodiment, the system goes to a power detection mode wherein a detector (not shown) installed in or connected to the switch controller 14 continuously monitors the electricity flow (S112). The detector may comprise an electricity detection circuit, for example. The amount of electricity to be used for such detection is only small, so there needs no substantial power consumption. The LED illumination device 10 is set to the normal lighting mode (S113), while energized, but switched to the emergency lighting mode so that the LED illumination device 10 is lightened as the emergency light, immediately after it is de-energized due to occurrence of a power failure. The emergency lighting mode has been described and, therefore, its detailed explanation is omitted.

Figure 8:
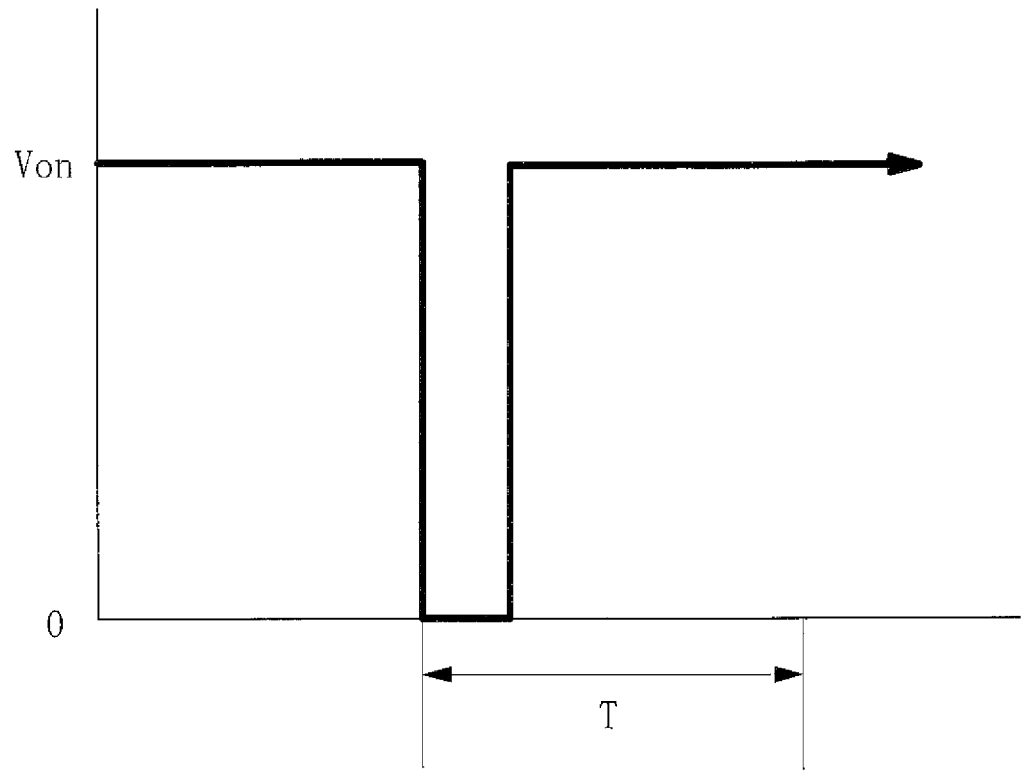
FIG. 8 An explanatory view showing the electric signal change in the switch controller, which should appear when sequential operation of the external switch ON/OFF has been carried out in accordance with the prescribed procedure for the normal light-out in Embodiment 2.

FIG. 8 is an explanatory view showing the electric signal change in the switch controller 14, which should appear when the sequential ON/OFF operation of the external switch 27 has been carried out for the normal light-out in this embodiment. More specifically, in this embodiment, when the sequential OFF→ON operation of the external switch 27 has been carried out within a predetermined time interval T, in other words, when the first (ON→)OFF operation is followed by the (OFF→)ON operation to be carried out in a predetermined time interval T counting from the first operation, it is discriminated such that the normal intentional light-out operation has been carried out (S107:No) and the system goes to the above-described power detection mode. As having been described in Embodiment 1, when compared with the prevailing light-out operation comprising only one ON→OFF operation of the external switch, this light-out operation requires the user to do the light-out operation in an unique manner. Accordingly, this manner of light-out operation should preferably be indicated near the external switch 27. The predetermined time interval in which the above-described sequential operation is to be carried out should preferably be of the order of several to ten seconds, taking into consideration that a person who have just made the light-out operation not in the prescribed sequential manner and then left the room may still stay in an area not too far to recognize and feel strange that the LED illumination device 10 in the room happens to be lightened again. This will be substantially the same as that described in Embodiment 1 and, therefore, its detailed description is omitted.

In this embodiment, when the sequential OFF→ON operation of the external switch 27, formerly ON, is completed within the predetermined time interval T, the switch controller 14 controls the LED illumination device 10 to be turned off. The external switch 27 is now being ON, so that an electricity flows into the electricity detection circuit, which monitors whether or not the AC power from the distribution board 26 is being supplied to the LED illumination device 10. Accordingly, it is possible to readily detect occurrence of a power failure, so that the light mode is switched to the emergency lighting mode wherein the LED illumination device 10 is driven by the battery 19 to be lightened as the emergency light.

In case of the emergency light-out due to the power failure, this embodiment will work in the same way as having been described in reference to FIG. 6 in Embodiment 1. More specifically, in this case, the current or volume value flowing into the switch controller 14 is suddenly lowered from Von that is a value in the ON condition to substantially zero, and the amount of electricity remains zero even after the predetermined time interval T has passed, as far as the power failure goes on. As such, by detecting and discriminating a specific power change that is apparently different from the power change (FIG. 8) appearing at the time of normal light-out operation (S107:Yes), the switch controller 14 discriminates such that a power failure occurs (S107:Yes) and lightens a part or a whole of the LED illumination devices 10 in the room as the emergency lights (S108).

Embodiment 3

Although Embodiment 1 and Embodiment 2 have been described separately, they may be combined with each other to formulate another embodiment. More specifically, when considering safety and convenience, it is preferable to provide the power detection mode applicable to the normal light-out operation, but it would be desirous in some cases that, even when a power supply is cut off in absence, the LED illumination device 10 should not be lightened as the emergency light but may be kept turned off, depending upon a building or room in which the device is installed. To cope with such requirement, there may be an embodiment wherein, when the sequential OFF→ON operation of the external switch 27, formerly being ON, has been carried out within a predetermined time interval T, as in the same way as in Embodiment 2, the system goes to the power detection mode so that it keeps the normal light-out (S113), as far as the electricity is alive (S112:Yes), but is ready to goes to the emergency lighting mode so that the LED illumination devices 10 in the room are lightened as the emergency lights, once a power supply is shut down while in the power detection mode, whereas, when the sequential OFF→ON→OFF operation of the external switch 27, formerly being ON, has been carried out within a predetermined time interval T, as in the same way as in Embodiment 1, the LED illumination devices 10 in the room are subject to the normal light-out (S111).

Embodiment 4

Figure 9:
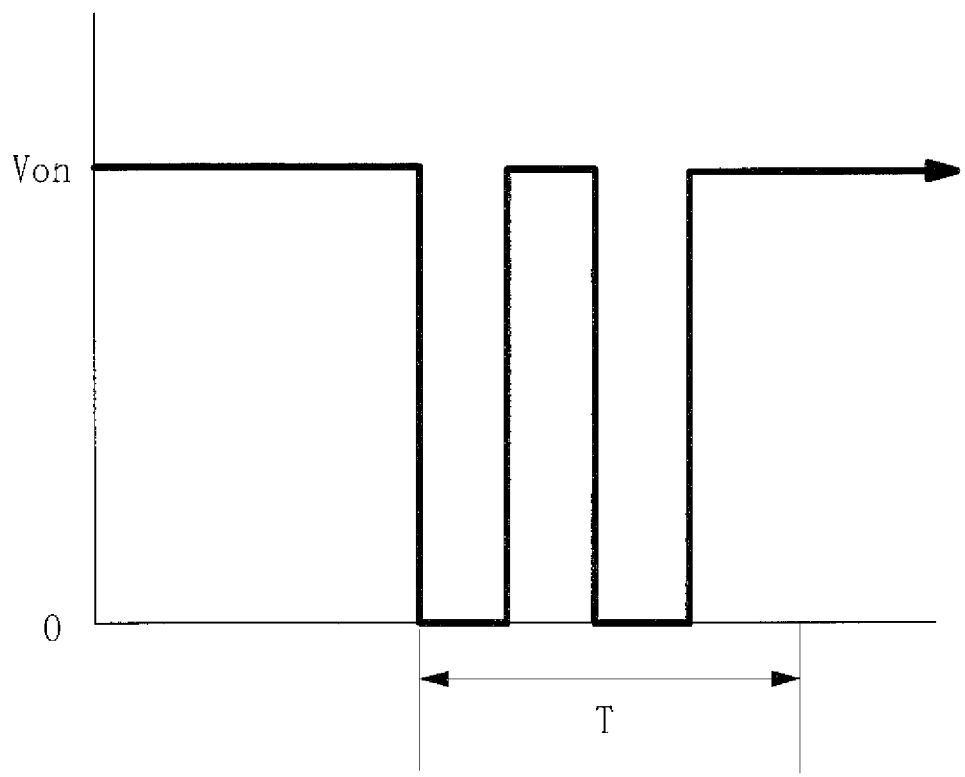
FIG. 9 An explanatory view showing the electric signal change in the switch controller, which should appear when sequential operation of the external switch ON/OFF has been carried out in accordance with the prescribed procedure for the setting of the light mode in Embodiment 4.

As an application of the control in the foregoing embodiments, the normal lighting mode and/or the emergency lighting mode may be set in any desired manner. For example, as shown in FIG. 9, when the sequential OFF→ON→OFF→ON operation of the external switch 27, formerly being ON, has been carried out within a predetermined time interval T, the switch controller 14 discriminates such that a setting mode is selected. By way of example, after the system enters the setting mode, the interior LED illumination device is caused to be blinking in several flush patterns, and when the external switch 27 is operated within a blinking time in any one of the flush patterns, it is discriminated such that a specific mode corresponding to said flush pattern is designated so that the device is set to said mode.

Figure 10:
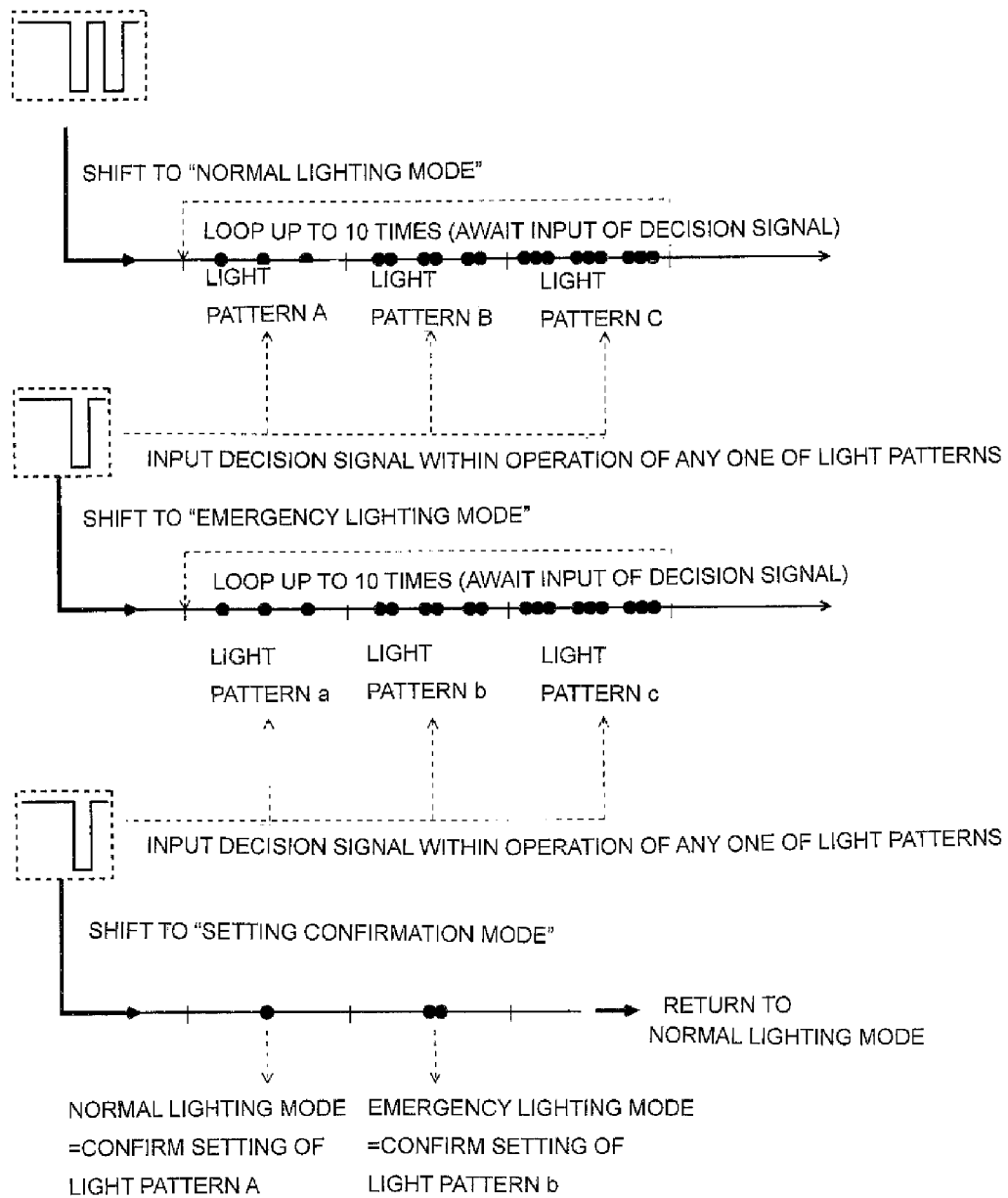
FIG. 10 A flowchart showing an example of setting of the light mode in Embodiment 4.

An example of such mode setting is shown in FIG. 10. When, as shown in FIG. 9, the sequential OFF→ON→OFF→ON operation of the external switch 27, formerly being ON, has been carried out within a predetermined time interval T, the device will first go to a condition setting mode for setting various conditions applicable for the normal lighting mode (FIG. 3:S103-S106). In this setting mode, the interior LED illumination device 10 repeats a few numbers of combination of blinking comprising different kinds of flush patterns being applied for predetermined time interval. For example, a first flush pattern A comprises blinking once within a second, which is repeated three times over three seconds, a second blush pattern B comprises blinking twice within a second, which is repeated three times over three seconds, and a third flush pattern C comprises blinking three times within a second, which is repeated three times over three seconds, and this pattern combination is looped no more than ten times and await input of any decision signal (to be described later) for 90 seconds at the maximum. When no input of the decision signal is confirmed within this period, the mode setting operation is completed to return to the normal mode (or shifted to the next condition setting mode for the emergency lighting mode). The input of the decision signal is obtained when, for example, the external switch 27 is turned ON→OFF→ON. To each flush pattern A-C is uniquely specified a predetermined set of conditions applicable to the normal lighting mode (e.g. setting of the intensity of illumination, setting of the upper/lower thresholds for switching between the first normal lighting mode and the second normal lighting mode (FIG. 3:S104, S106)). When the external switch 27 is turned ON→OFF→ON during the blinking period of the LED illumination device 10 in any one of the flush patterns A-C, the normal lighting mode will become operable in the conditions determined by the specified flush pattern.

After the normal lighting mode has been set in the foregoing manner, then, here is the condition setting mode for the emergency lighting mode, and the device repeats a few numbers of combination of blinking comprising different kinds of flush patterns being applied for predetermined time interval. The flush patterns applicable to this condition setting mode will not be limited and may be different from the flush patterns A-C used in the condition setting mode for the normal lighting mode. In an example of FIG. 6, however, likewise, a first flush pattern (a) comprises blinking once within a second, which is repeated three times over three seconds, a second blush pattern (b) comprises blinking twice within a second, which is repeated three times over three seconds, and a third flush pattern (c) comprises blinking three times within a second, which is repeated three times over three seconds, and this pattern combination is looped no more than ten times and await input of any decision signal (to be described later) for 90 seconds at the maximum. To each flush pattern (a)-(c) is uniquely specified a predetermined set of conditions applicable to the emergency lighting mode (e.g. selection of the lights to be lightened as the emergency lights in the LED illumination device 10, setting of the lower threshold of the battery residual amount for the purpose of preventing the over-discharge (FIG. 3:S104, S106)). When the external switch 27 is turned ON→OFF→ON during the blinking period of the LED illumination device 10 in any one of the flush patterns (a)-(c), the conditions of the emergency lighting mode may become operable in the conditions determined by the specified flush pattern.

After the emergency lighting mode has been set in the foregoing manner, then, the LED illumination device 10 is caused to blink for the purpose of confirmation of the mode conditions thus determined. This should preferably be achieved by reproducing the respective flush patterns of the normal lighting mode and the emergency lighting mode, one by one. Suppose that the normal lighting mode has been determined to correspond to the flush pattern A and the emergency lighting mode has been determined to correspond to the flush pattern (b). In this case, the device is first caused to blink in the same as the flush pattern A or in an equivalent flush pattern (e.g. by blinking twice in a second, as shown in FIG. 8) and then caused to blink in the same as the flush pattern (b) or in an equivalent flush pattern (e.g. by blinking twice in a second, as shown in FIG. 8), which will enable confirmation of the mode conditions of the normal lighting mode and the emergency lighting mode. When this confirmation mode is finished, a series of the mode setting operation is completed, and the device is lightened in the normal lighting mode, to which the determined mode condition is applied.

LEGENDS

10 fluorescent lamp type LED illumination device
11 cover
12 base
12a, 12b base pin
13 first power supply circuit
14 switch controller (controller)
15 LED drive circuit
16 rectifier
17 voltage transformer
18 electrolytic capacitor
19 battery
20 second power supply circuit
21 charge controller (controller)
22 LED
23 communication control chip
24 AC-DC converter
25 internal IC switch (controller)
26 distribution board in facility
27 external switch

The invention claimed is:

1. A fluorescent LED illumination device fittable between a pair of sockets already provided for a fluorescent lamp, comprising a first power supply circuit that illuminates LED's by using a DC power obtained by converting and rectifying an AC power supplied from the sockets, a second power supply circuit that illuminates the LED's by using an internal buttery, and a controller that discriminates one of a normal lighting mode wherein the LED's are lightened via said first power supply circuit or said second power supply circuit when a light switch is ON, a normal light-out mode wherein the LED's are not lightened when said light switch is OFF and an emergency lighting mode wherein the LED's are lightened as emergent lights via said second power supply circuit when an AC power supply is not alive, said controller further operating, in response to a result of said discrimination, to select an applicable one among said normal lighting mode, said normal light-out mode and said emergency lighting mode, said contoller detecting a change, within a predetermined time interval, of a voltage or current value of electricity flowing into the illumination device to discriminate such that, when detecting that, within the predetermined time interval, said value is lowered only one time from a predetermined value of electricity that will normally flow when the light switch is ON to substantially zero, which remains standstill, a power failure interrupts the AC power supply, to control such that the normal lighting mode should be switched to the emergency lighting mode, whereas, when detecting that, within the predetermined time interval, there occurs a change of the current or voltage value including a decrease from the predetermined value of electricity that will normally flow when the light switch is ON to substantially zero, followed by an increase to said predetermined value, the normal light-out operation has been carried out to control such that the normal lighting mode should be switched to the normal light-out mode.

2. The fluorescent LED illumination device of claim 1, wherein said controller discriminates such that the normal light-out operation has been carried out when detecting that sequential OFF→ON→OFF operation of the light switch that was formally ON has been carried out within the predetermined time interval, and thus controls such that the normal lighting mode should be switched to the normal light-out mode.

3. The fluorescent LED illumination device of claim 1, wherein said controller discriminates such that the normal light-out operation has been carried out when detecting that sequential OFF→ON operation of the light switch that was formerly ON has been carried out within the predetermined time interval, and thus controls such that the normal lighting mode should be switched to the normal light-out mode, said controller constantly monitoring an electricity condition to control such that, as far as that is confirmed, that the LED's are lightened in the normal lighting mode, but once confirming interruption of electricity, said controller controlling such that the normal lighting mode is soon switched to the emergency lighting mode so that the LED's are lightened as an emergency light.

4. A method for switching lighting modes in a fluorescent LED illumination device fittable between a pair of sockets already provided for a fluorescent lamp, including a first power supply circuit that illuminates LED's by using a DC power obtained by converting and rectifying an AC power supplied from the sockets, and a second power supply circuit that illuminates the LED's by using an internal buttery, said fluorescent LED illumination device being driven and controlled in either one of a normal lighting mode wherein the LED's are lightened via said first power supply circuit or said second power supply circuit when a light switch is ON, a normal light-out mode wherein the LED's are not lightened when said light switch is OFF and an emergency lighting mode wherein the LED's are lightened as an emergency lamp via said second power supply circuit when an AC power supply is interrupted, said method comprising the steps of detecting a change, within a predetermined time period, of a voltage or current value of electricity flowing into the illumination device, switching the normal lighting mode to the emergency lighting mode, when detecting that, within the predetermined time interval, said value is lowered only one time from a predetermined value of electricity that will normally flow when the light switch is ON to substantially zero, which remains standstill, resulting in discrimination that a power failure interrupts the AC power supply, and switching the normal lighting mode to the normal light-out mode, when detecting that, within the predetermined time interval, there occurs a change of the current or voltage value including a decrease from the predetermined value of electricity that will normally flow when the light switch is ON to substantially zero, followed by an increase to said predetermined value, resulting in discrimination that the normal light-out operation has been carried out.

* * * * *